Figure 1:

J. F. MILNER.
MOISTENER.
APPLICATION FILED JULY 30, 1910.

1,000,428.

Patented Aug. 15, 1911.

UNITED STATES PATENT OFFICE.

JOHN F. MILNER, OF ALAMOGORDO, TERRITORY OF NEW MEXICO.

MOISTENER.

1,000,428.

Specification of Letters Patent.  Patented Aug. 15, 1911.

Application filed July 30, 1910. Serial No. 574,720.

*To all whom it may concern:*

Be it known that I, JOHN F. MILNER, a citizen of the United States, residing at Alamogordo, county of Otero, and Territory of New Mexico, have invented certain new and useful Improvements in Moisteners, of which the following is a specification.

This invention relates to moisteners.

The present invention has for its object the provision of a novel moistener especially adapted for use in humidifiers for cigars and tobacco, which will be inexpensive to manufacture, strong and durable, of convenient form to occupy but small space when in use, and provided with means whereby it can be readily suspended from both ends so that it can be conveniently positioned.

In carrying out the invention I provide a frame of novel construction, made of wire, having suspending rings at its ends, and embedded in white sand cement which is molded thereabout. This cement is made from white sand, a material of porous and absorptive properties obtained from the locality known as "White Sands" in New Mexico. White sand contains the following ingredients:

Calcium sulfate (gypsum)__ .85%
Sulf. alumin _____ .05%
Gallium _____ .03%
Sodium, potash, borax, a small per cent. varying according to different samples analyzed.

The whole being calcined at 250 degrees F.

The moistener need be soaked in water only every few days and will absorb about 25% of its weight in water. When suspended, it will gradually give off its water by evaporation, without dripping, keeping the air in its vicinity suitably humid or moist.

I do not restrict the moistener to any special shape as it may be cylindrical, square, or of any octagonal shape and, if preferred, suitably colored and provided with designs, nor do I restrict the number of the wires constituting the reinforcing means which is shown in the drawings.

Figure 2:
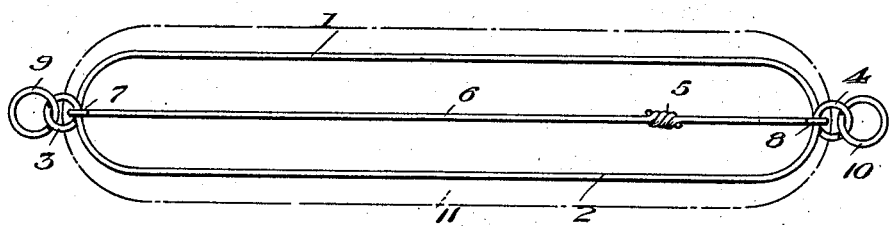

In the accompanying drawings:—Figure 1 is a view of the complete moistener; and Fig. 2, a similar view, showing the reinforcing frame in full lines and the molded body in dotted lines.

The frame is composed of the members 1 and 2, preferably formed of a single piece of wire, corrugated or crimped if desired, formed into eyes 3 and 4 at the ends of the moistener and having its ends connected at 5. Another wire 6, corrugated or crimped if desired, extends direct from eye 4 to eye 3 and is hooked into said eyes at 7 and 8, constituting a center longitudinal reinforce for the moistener. Additional wires may be employed for the frame-work if desired. Rings 9 and 10 are engaged with the eyes 4 and 3.

The moistener body 11 is molded about the frame, leaving only the ends of the eyes and the rings exposed, the entire frame being embedded in said body. The body 11 is made of white sand cement obtained from the locality known as "White Sands" in New Mexico and may be molded into any desired shape such as cylindrical, square, or octagonal, and, if desired, suitably colored or provided with designs. This body, owing to the peculiar nature of the material of which it is made, is porous and absorptive. It will absorb about 25% of its weight in water and will gradually give off this water by evaporation, without dripping, for several days without re-soaking.

The rings 9 and 10 afford convenient means whereby the moistener may be suspended at both ends from hooks, nails, or other projections, thus adapting the device to cigar and tobacco cases or humidifiers and the moistener will keep the air in its vicinity continually humid or moist for several days without requiring re-soaking.

Having thus described my invention, what I claim as new and desire to secure by Letters Patent, is:—

1. A moistener having a molded body of white sand cement as set forth, a reinforcing device embedded therein provided with eyes at its opposite ends, and rings engaged with said eyes and adapted for the suspension of said moistener at both ends thereof.

2. A moistener having a molded body of white sand cement as set forth, a frame consisting of a plurality of members connected at opposite ends, a central reinforcing member connected to the aforesaid members at the opposite ends thereof, and suspending devices at the ends of said frame.

3. A moistener having a molded body of white sand cement as set forth, a frame embedded therein composed of a plurality of members provided with eyes at their opposite ends and there connected together, a central reinforcing member having its extremities engaged with said eyes, and externally suspending rings engaged with said eyes.

4. A moistener whose body is composed of "white sand" cement, a reinforcing device embedded therein and suspending devices engaged at opposite ends of said reinforcing device.

5. A moistener having a frame composed of longitudinal members which are provided with eyes at their opposite ends, and a central member engaged with said eyes, rings engaged with said eyes and adapted for the suspension of said moistener at both ends thereof, and a body of absorbent earthy material molded around said frame, the rings being located on the exterior of said body.

In testimony whereof, I hereunto affix my signature in presence of two witnesses.

JOHN F. MILNER.

Witnesses:
  GEO. WARNOCK,
  C. L. HALL.

---

Copies of this patent may be obtained for five cents each, by addressing the "Commissioner of Patents. Washington, D. C."